June 12, 1962   N. M. DORSCH   3,038,741
MEANS FOR HITCHING AGRICULTURAL IMPLEMENTS TO A TRACTOR
Filed July 13, 1961   2 Sheets-Sheet 1
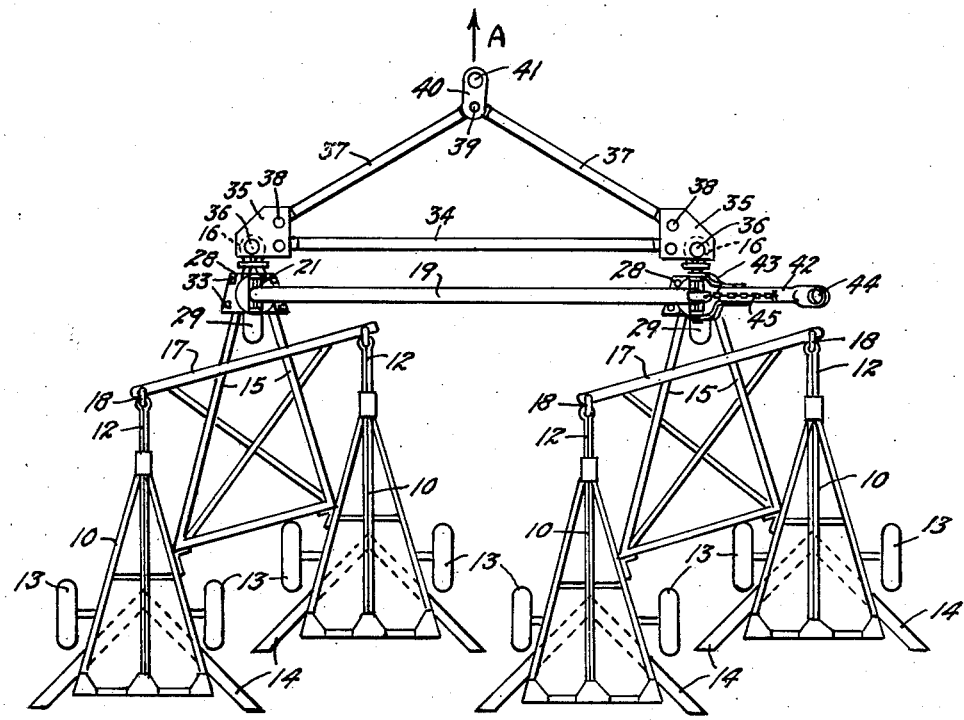
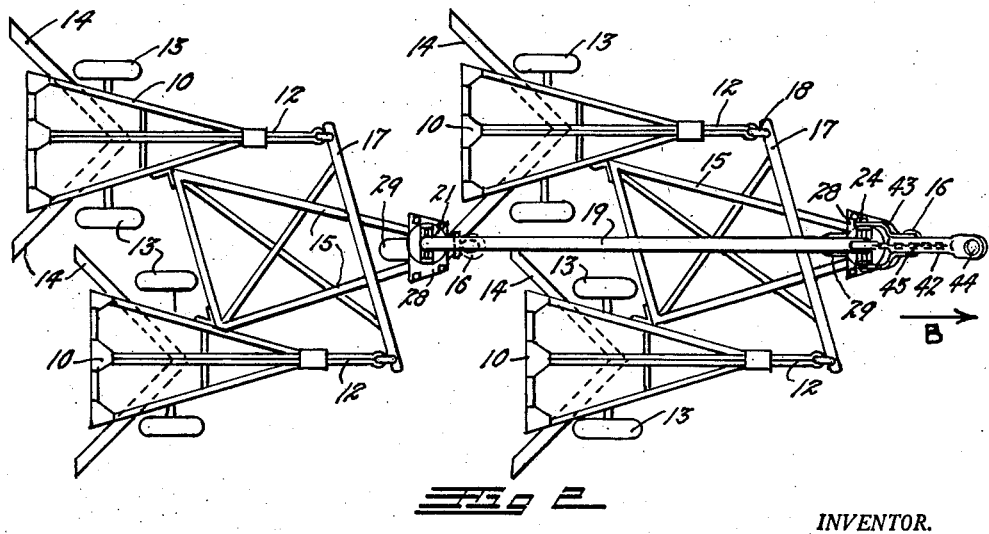
INVENTOR.
NEAL M. DORSCH
BY
ATTORNEY June 12, 1962 N. M. DORSCH 3,038,741
MEANS FOR HITCHING AGRICULTURAL IMPLEMENTS TO A TRACTOR
Filed July 13, 1961 2 Sheets-Sheet 2
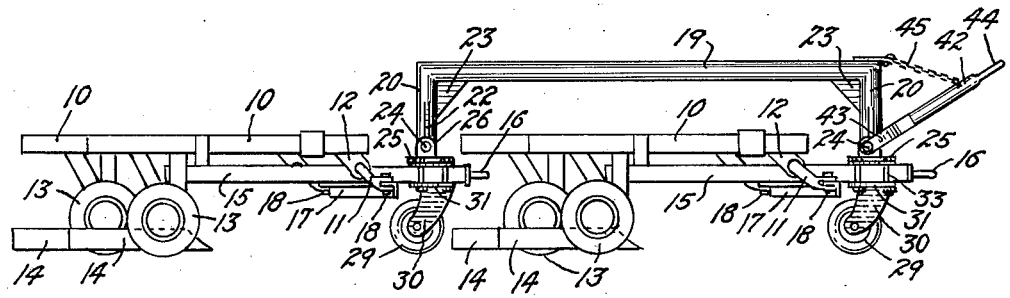
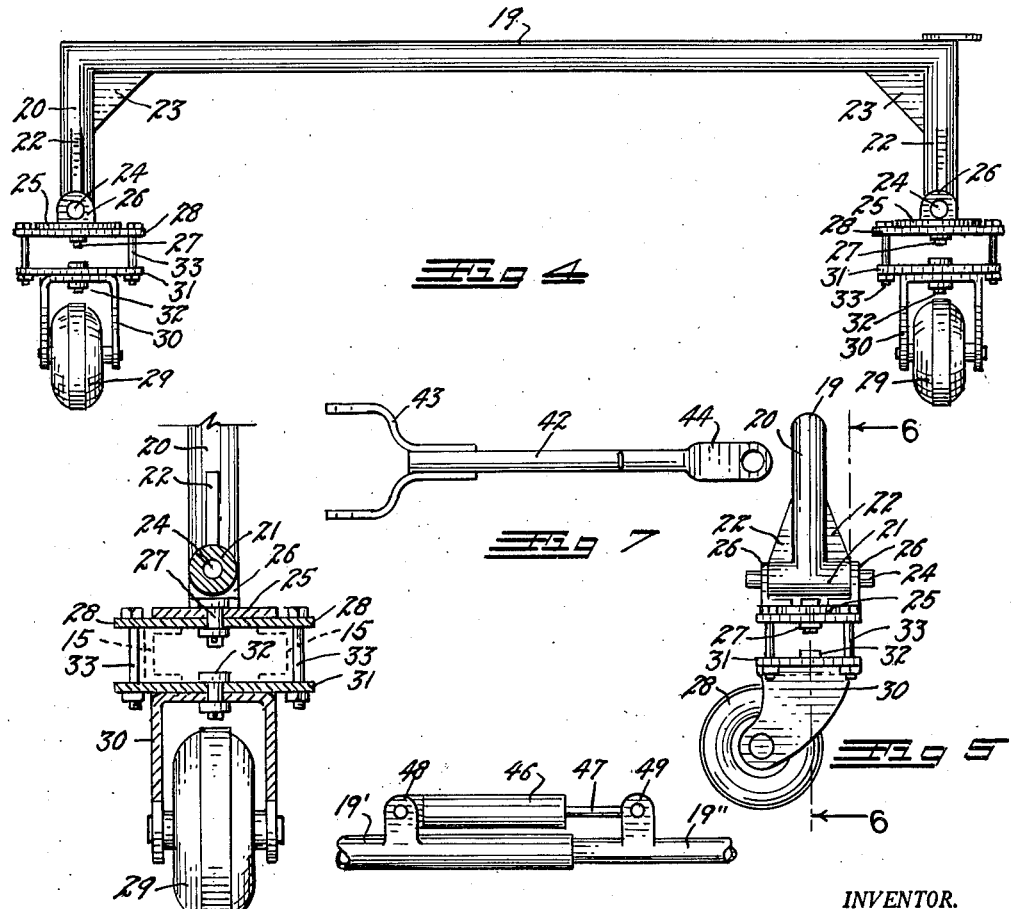
INVENTOR.
NEAL M. DORSCH
BY
ATTORNEY United States Patent Office 3,038,741
Patented June 12, 1962

3,038,741
MEANS FOR HITCHING AGRICULTURAL
IMPLEMENTS TO A TRACTOR
Neal M. Dorsch, Box 311, Flagler, Colo.
Filed July 13, 1961, Ser. No. 123,702
5 Claims. (Cl. 280—412)

This invention relates to means for hitching agricultural implements to a tractor and has for its principal object the provision of a tractor implement hitch which will enable a plurality of implements, more particularly cultivators, to be simultaneously drawn across a field to provide an exceedingly wide swath and which will automatically fold to a narrow width for transporting the cultivators from field to field.

Multiple hitches are at present on the market for towing two, and in some cases three, conventional cultivators simultaneously behind a tractor. Another object of this invention is to provide means whereby two of these multiple hitches can be towed behind a single tractor so that from four to six standard cultivators can be drawn across the field in a staggered overlapped arrangement to cultivate a swath of four or more rows simultaneously.

A further object is to provide means for hitching a plurality of the above conventional multiple hitches to a tractor which, when drawn forwardly, will align the cultivators crosswise of the line of travel to cover a swath of maximum width and which, when drawn sidewardly, will cause the multiple hitches to swing into alignment with the line of travel so as to provide a minimum overall width for highway travel and field-to-field transportation without it being necessary to disconnect any of the multiple hitches or the cultivators.

Other objects and advantages reside in the detail construction of the invention, which is designed for simplicity, economy, and efficiency. These will become more apparent from the following description.

In the following detailed description of the invention, reference is held to the accompanying drawing which forms a part hereof. Like numerals refer to like parts in all views of the drawing and throughout the description.

In the drawing:

FIG. 1 is a top plan view of the improved hitching means showing it in the forward moving, field-cultivating, maximum swath position;

FIG. 2 is a similar view showing the hitching means in the sideward moving, minimum swath, transport position;

FIG. 3 is a side elevational view of FIG. 2;

FIG. 4 is an enlarged front view of a bridge beam structure employed in the improved hitching means;

FIG. 5 is a similarly enlarged side view of the bridge beam structure of FIG. 4;

FIG. 6 is a still further enlarged detail section taken on the line 6—6, FIG. 5;

FIG. 7 is a detail view of a side towing tongue for use in towing the improved hitching means in the transport position; and FIG. 8 is a fragmentary front view of a portion of an alternate form of bridge beam structure having hydraulic means for increasing and decreasing the width of the bridge beam structure.

The hitching means of this invention is for use with any type of agricultural implement such as a cultivator and with any type of the conventional multiple cultivator hitches at present on the market. For the purpose of illustration, a conventional V-blade cultivator is indicated at 10 and a conventional multiple hitch frame is shown at 15. The cultivators illustrated have triangular frames provided with towing tongues 12 at the forward apexes, ground engaging wheels 13, and cultivating blades 14.

The multiple hitch frames illustrated are of the "noble" type and they also have triangular shape terminating at their forward apexes in draw bar eyes 16 and carrying angularly-positioned, sidewardly-projecting draw bars 17. One of the cultivators 10 is attached to each extremity of each draw bar in any conventional manner. As illustrated, the cultivator towing tongues 12 are connected to pins 18 in the extremities of the draw bars 17 by means of conventional connectors 11 so as to be simultaneously towed in staggered overlapping relation.

The above described equipment is conventional. This invention relates to means for hitching a plurality of the above multiple hitch frames 15 to a tractor or other towing vehicle in such a way that the cultivators will be transversely aligned in staggered overlapping relation for field use, as illustrated in FIG. 1, yet will swing into longitudinal alignment with the direction of travel for transport purposes, as shown in FIG. 2.

This invention employs a horizontal, tubular bridge beam structure comprising an elevated beam 19 having downwardly extending vertical extremities 20 forming an inverted U-shape. The extremities 20 terminate at the bottom in horizontal pin sleeves 21. The pin sleeves 21 are positioned parallel to each other and at right angles to the axis of the beam 19. The vertical evtremities 20 are rigidly braced from the pin sleeves by suitable gusset plates 22 and the downwardly turned extremities 20 are rigidly braced from the beam 19 by similar gusset plates 23.

A horizontal hinge pin 24 extends through and projects forwardly and rearwardly from each pin sleeve 21. A preferably circular, hinged plate 25 is hingedly mounted on the projecting extremities of each hinge pin through the medium of hinge ears 26 through which the hinge pin 24 passes. Each hinged plate 25 is provided with an axially positioned downwardly extending upper pivot pin 27 upon which an upper clamp plate 28 is rotatably mounted below each hinged plate 25. The upper clamp plates 28 are designed to rest upon and be clamped to the forward extremities of the hitch frames 15 to maintain the inverted-U-shaped overhead beam 19 in fixed vertical position. The weight of the beam and the weight of the forward extremities of the hitch frames 15 are supported upon rubber-tired castor wheels 29, there being one of said wheels below each of the downwardly turned extremity of the elevated beam 19. Each castor wheel is rotatably mounted in an offset castor yoke 30 which is rotatably mounted below a lower clamp plate 31 upon a lower pivot pin 32.

Each triangular multiple hitch frame 15 is clamped adjacent its forward extremity or apex and rearwardly of its draw bar eye 16 between one of the upper clamp plates 28 and one of the lower clamp plates 31 by means of suitable vertically-extending clamp bolts 33 so that each multiple hitch frame will be tiltably and rotatably attached at its forward extremity below one of the vertical extremities 20 of the beam 19 and one of the castor wheels 29 will be swiveled below each of the latter attachment points. The apex of each multiple hitch frame 15 will extend forwardly to position its draw bar eye 16 forwardly of the point of attachment.

A spreader bar 34 extends between the draw bar eyes 16 of the hitch frames 15. The spreader bar is preferably provided at each of its extremities with two similar, vertically-spaced terminal plates 35 between which the draw bar eyes pass and are locked in place by means of removable hitch pins 36. A drag link 37 is hinged at 38 to each terminal plate 35 and the two drag links extend forwardly and inwardly and terminate in an attachment pin or bolt 39 in a draw bar link 40 provided with a suitable opening 41 for attachment to the draw bar of a tractor or other towing vehicle.

For field use, the towing vehicle is attached to the draw bar link 40 and the entire assembly is towed in the direction of the arrow "A," FIG. 1 to provide a cultivation swath of maximum width.

When it is desired to tow the assembly from field to field, the hitch pins are withdrawn and the spreader bar 34 is removed, with its attached drag links 37 and draw bar link 41. The tractor is then attached to one extremity of the bridge beam structure and the latter is towed in the direction of its length, as indicated by the arrow "B" in FIG. 2. As the assembly moves in the direction of the arrow "B," the hitch frames will rotate about the axes of the upper pivot pins 27 and the castor wheel yokes will rotate about the axes of the lower pivot pins 32 so that the right cultivator assembly will swing beneath the elevated beam 19 and the left cultivator assembly will swing into alignment behind the beam, as shown in FIG. 2, to form a swath of minimum width for roadway travel.

The tractor can be attached for roadway travel in any suitable manner. For convenience, however, a side tongue 42 is provided. The side tongue is provided with a forked extremity 43, the furcations of which are perforated to receive the projecting extremities of one of the hinge pins 24, and with a connecting extremity 44 for connection to the draw bar of the tractor. The side tongue 42 may be removed when not in use. It is preferred, however, to allow it to remain in place temporarily supported by a suitable chain 45.

Should it be desirable to have the bridge beam structure adjustable in length to suit various field conditions, the elevated beam 19 may be made in two telescoping parts as indicated at 19' and 19" in FIG. 8. A hydraulic cylinder 46 is mounted in a cylinder bracket 48 on one of the parts to reciprocate a plunger 47 connected to a plunger bracket 49 on the other part. The hydraulic cylinder would, of course, be connected to the hydraulic system of the tractor so that the spacing between the hitch frames 15 would be under control of the driver at all times.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. Means for hitching a plurality of sets of ground working implements to a towing vehicle so that the implements will travel in side-by-side relation when towed forwardly and in longitudinal aligned relation when towed sidewardly comprising: an inverted-U-shaped beam structure with vertical extremities; a horizontal hinge pin mounted in the lower extremity of each vertical extremity in parallel relation to each other and at right angles to the axis of said beam structure; a substantially horizontal plate hingedly mounted on and below each hinge pin; an upper implement plate pivotally mounted on and below each hinged plate; means for attaching each implement plate on and to a set of ground working implements; a first forward hitch device connected to both vertical extremities for drawing said beam structure forwardly at right angles to the line of travel; and a second side hitch device connected to one of said vertical extremities for drawing said beam structure sidewardly in alignment with the line of travel.

2. Means for hitching a plurality of sets of ground working implements to a towing vehicle so that the implements will travel in side-by-side relation when towed forwardly and in longitudinal aligned relation when towed sidewardly comprising: an inverted-U-shaped beam structure with vertical extremities; a horizontal hinge pin mounted in the lower extremity of each vertical extremity in parallel relation to each other and at right angles to the axis of said beam structure; a substantially horizontal plate hingedly mounted on and below each hinge pin; an upper implement plate pivotally mounted on and below each hinged plate; a lower implement plate positioned below each upper implement plate to form a pair of implement plates; means for clamping each pair of implement plates to and adjacent the forward extremity of a set of ground working implements; a first forward hitch device connected to both vertical extremities for drawing said beam structure forwardly at right angles to the line of travel; and a second side hitch device connected to one of said vertical extremities for drawing said beam structure sidewardly in alignment with the line of travel.

3. Means for hitching a plurality of sets of ground working implements to a towing vehicle so that the implements will travel in side-by-side relation when towed forwardly and in longitudinal aligned relation when towed sidewardly comprising: an inverted-U-shaped beam structure with vertical extremities; a horizontal hinge pin mounted in the lower extremity of each vertical extremity in parallel relation to each other and at right angles to the axis of said beam structure; a substantially horizontal plate hingedly mounted on and below each hinge pin; an upper implement plate pivotally mounted on and below each hinged plate; a lower implement plate positioned below each upper implement plate to form a pair of implement plates; means for clamping each pair of implement plates to and adjacent the forward extremity of a set of ground working implements; a castor wheel yoke pivotally mounted on and below each lower implement plate so as to rotate in a horizontal plane; a ground engaging castor wheel mounted in each castor wheel yoke; a first forward hitch device connected to both vertical extremities for drawing said beam structure forwardly at right angles to the line of travel; and a second side hitch device connected to one of said vertical extremities for drawing said beam structure sidewardly in alignment with the line of travel.

4. Means for hitching a plurality of sets of ground working implements to a towing vehicle so that the implements will travel in side-by-side relation when towed forwardly and in longitudinal aligned relation when towed sidewardly comprising: an inverted-U-shaped beam structure with vertical extremities; a horizontal hinge pin mounted in the lower extremity of each vertical extremity in parallel relation to each other and at right angles to the axis of said beam structure; a substantially horizontal plate hingedly mounted on and below each hinge pin; an upper implement plate pivotally mounted on and below each hinged plate; a lower implement plate positioned below each upper implement plate to form a pair of implement plates; means for clamping each pair of implement plates to and adjacent the forward extremity of a set of ground working implements; a castor wheel yoke pivotally mounted on and below each lower implement plate so as to rotate in a horizontal plane; a ground engaging castor wheel mounted in each castor wheel yoke; a detachable spreader bar pivotally connected at each of its extremities to the forward extremity of one of said sets of ground-working implements and extending therebetween; a hitch device carried by said spreader bar for drawing said beam structure forwardly at right angles to the line of travel; and a second side hitch device connected to one of said vertical extremities for drawing said beam structure sidewardly in alignment with the line of travel.

5. Means for hitching a plurality of sets of ground working implements to a towing vehicle so that the implements will travel in side-by-side relation when towed forwardly and in longitudinal aligned relation when towed sidewardly comprising: an inverted-U-shaped beam structure with vertical extremities; a horizontal hinge pin mounted in the lower extremity of each vertical extremity in parallel relation to each other and at right angles to the axis of said beam structure; a substantially horizontal plate hingedly mounted on and below each hinge pin; an upper implement plate pivotally mounted on and below each hinged plate; a lower implement plate positioned below each upper implement plate to form a pair of implement plates; means for clamping each pair of implement plates to and adjacent the forward extremity of a set of ground working implements; a castor wheel yoke pivotally mounted on and below each lower implement plate so as to rotate in a horizontal plane; a ground engaging castor wheel mounted in each castor wheel yoke; a detachable spreader bar pivotally connected at each of its extremities to the forward extremity of one of said sets of ground-working implements and extending therebetween; a hitch device carried by said spreader bar for drawing said spreader bar forwardly at right angles to the line of travel; a side tongue; and means securing said side tongue to one of said hinged plates for drawing said beam structure in a direction parallel to its length.

References Cited in the file of this patent

UNITED STATES PATENTS 2,955,848  Hyland et al. _____ Oct. 11, 1960
3,008,732  Raney _____ Nov. 14, 1961

FOREIGN PATENTS 691,526  Great Britain _____ May 13, 1953